United States Patent [19]

Moricca et al.

[11] 4,080,517
[45] Mar. 21, 1978

[54] AUDIO SENSORY APPARATUS AND METHOD FOR MONITORING INDICATOR LAMP STATUS OF MULTI-LINE TELEPHONE INSTRUMENT

[75] Inventors: Larry S. Moricca, Churubusco; Gregory A. Zaker, Fort Wayne, both of Ind.

[73] Assignee: Inventive Industries, Inc., Houston, Tex.

[21] Appl. No.: 710,292

[22] Filed: Jul. 30, 1976

[51] Int. Cl.² .......................................... H04M 1/72
[52] U.S. Cl. .................................. 179/99; 179/81 C; 179/84 T
[58] Field of Search .......... 179/1 B, 2 A, 2 R, 27 FB, 179/27 FC, 81 C, 84 L, 84 T, 90 L, 90 K, 91 R, 91 A, 99, 1 MN; 340/384 R, 384 E

[56] References Cited
U.S. PATENT DOCUMENTS

| | | | |
|---|---|---|---|
| 3,005,053 | 10/1961 | Schmidt | 179/84 T |
| 3,234,337 | 2/1966 | Schuyler | 179/91 R |
| 3,665,111 | 5/1972 | Schieser | 179/81 C |

*Primary Examiner*—Kathleen H. Claffy
*Assistant Examiner*—Randall P. Myers

*Attorney, Agent, or Firm*—Gust, Irish, Jeffers & Rickert

[57] ABSTRACT

Apparatus for enabling a blind person to determine the status of a plurality of telephone lines from the illumination condition of signal lamps associated therewith which respectively indicate the "ON", "OFF", "RING" or "HOLD" status of each line. Photosensors sense the illumination condition of each lamp and provide first signals in response thereto. The apparatus sequentially and repetitively scans the photosensors and the resultant sequentially appearing first signals are serially and repetitively converted to digitally coded signals which are serially read-into storage means. Means are provided for sequentially and repetitively generating a plurality of audio tone signals respectively having progressively different frequencies, each tone signal corresponding to a particular line. The coded signals are serially read-out of storage at the rate of the tone signal generation and are serially decoded. The tone signals are coupled to audio output means in response to predetermined ones of the decoded signals so that a predetermined condition of a particular lamp is indicated by an audible tone of a particular tone duration.

30 Claims, 10 Drawing Figures

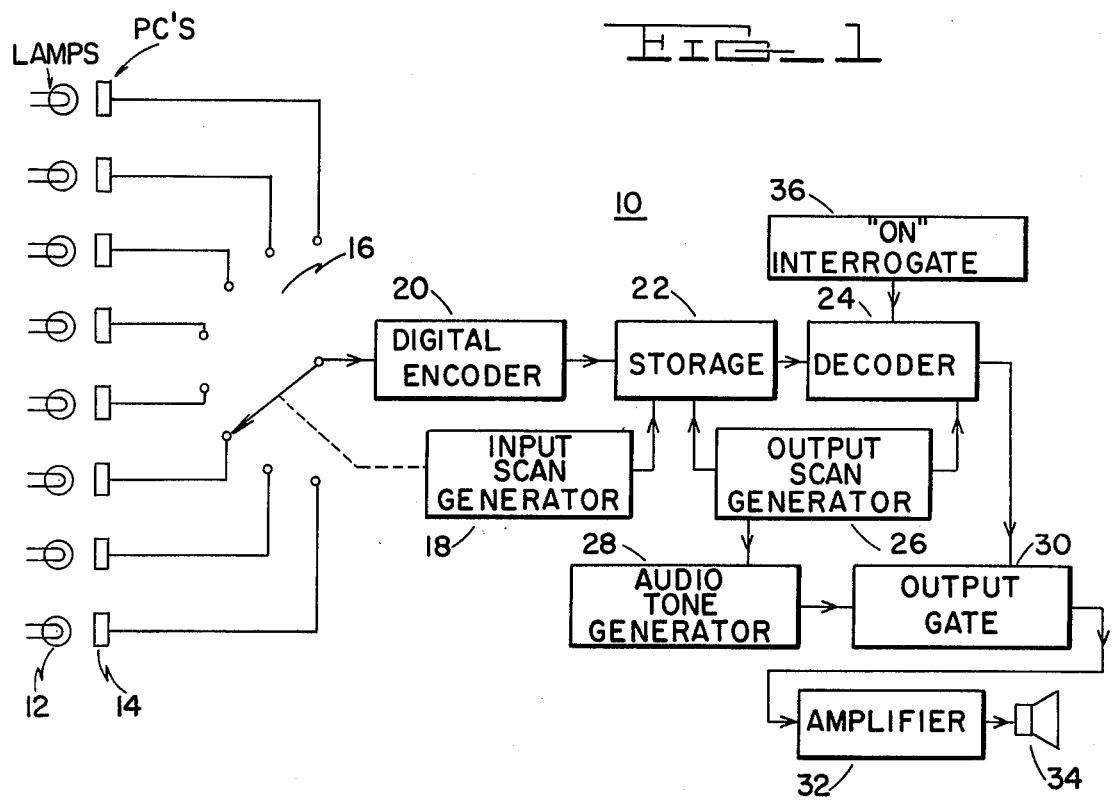
FIG_1
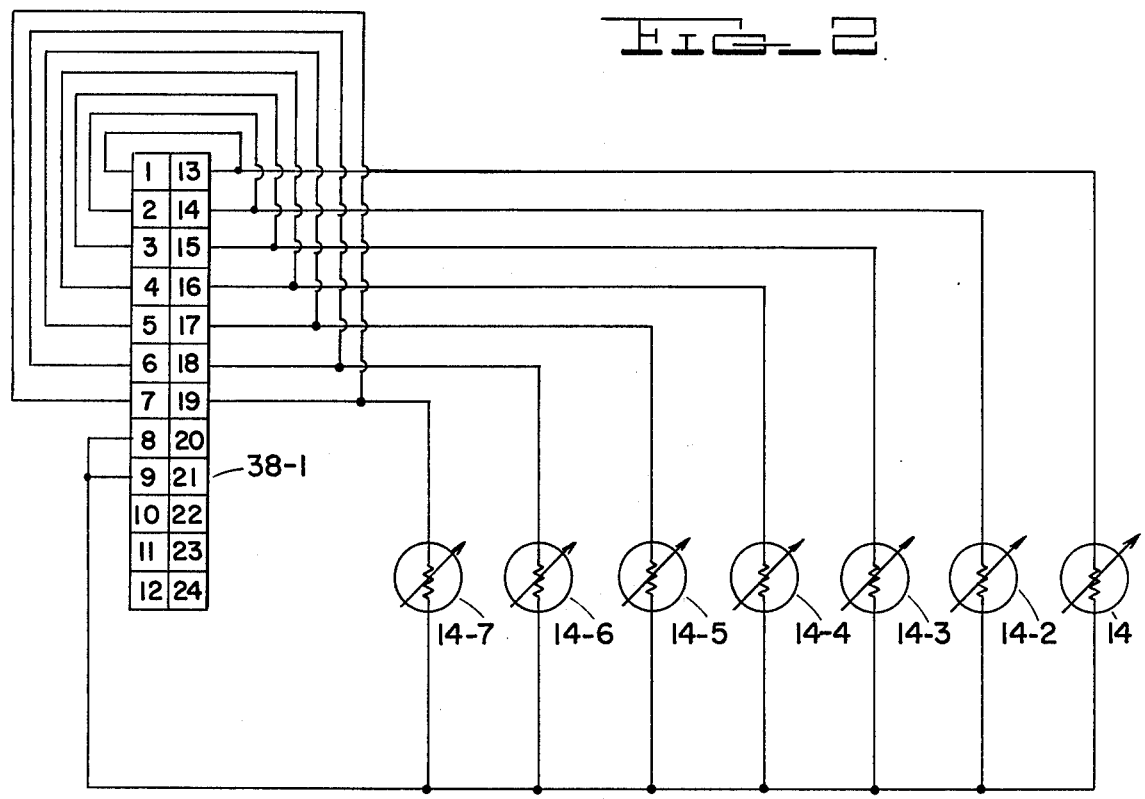
FIG_2

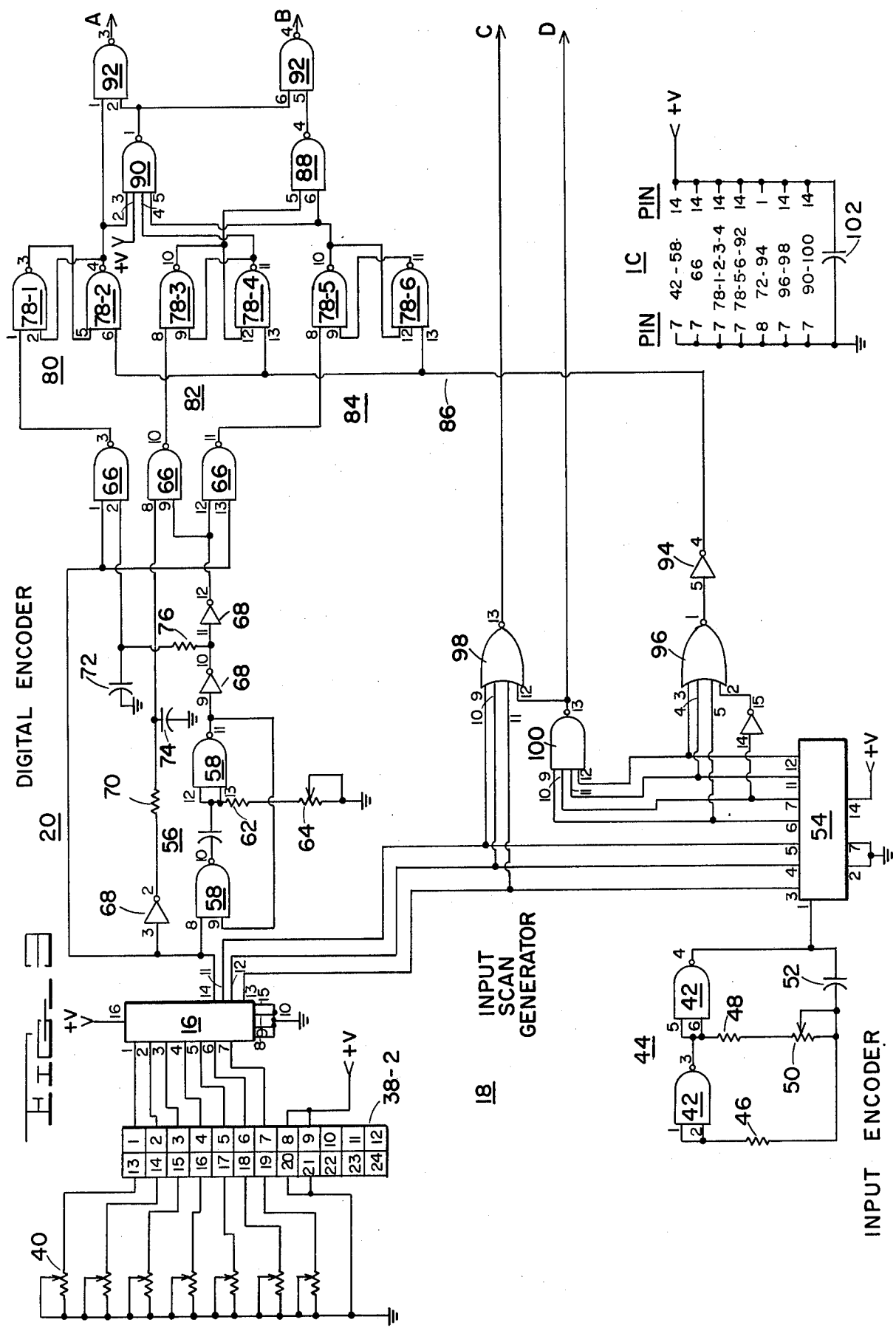

FIG. 6
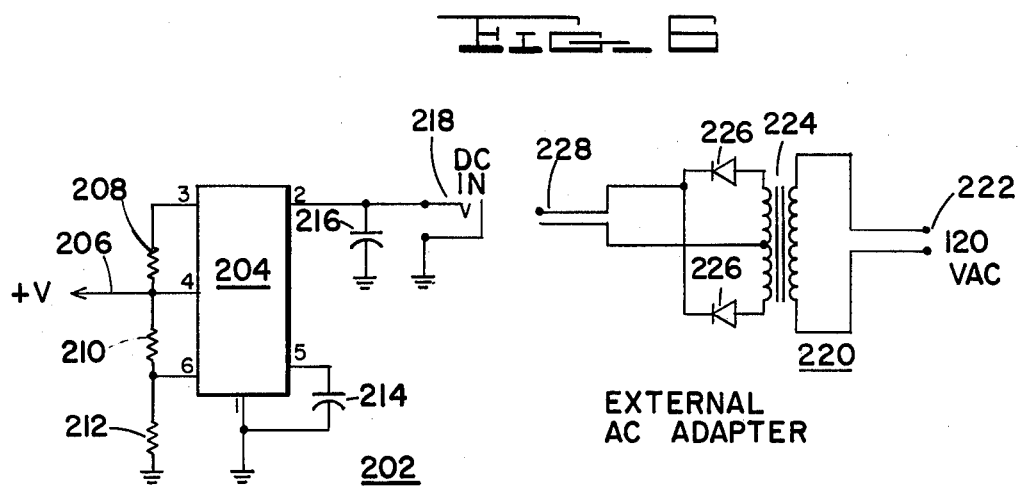
POWER SUPPLY
EXTERNAL AC ADAPTER
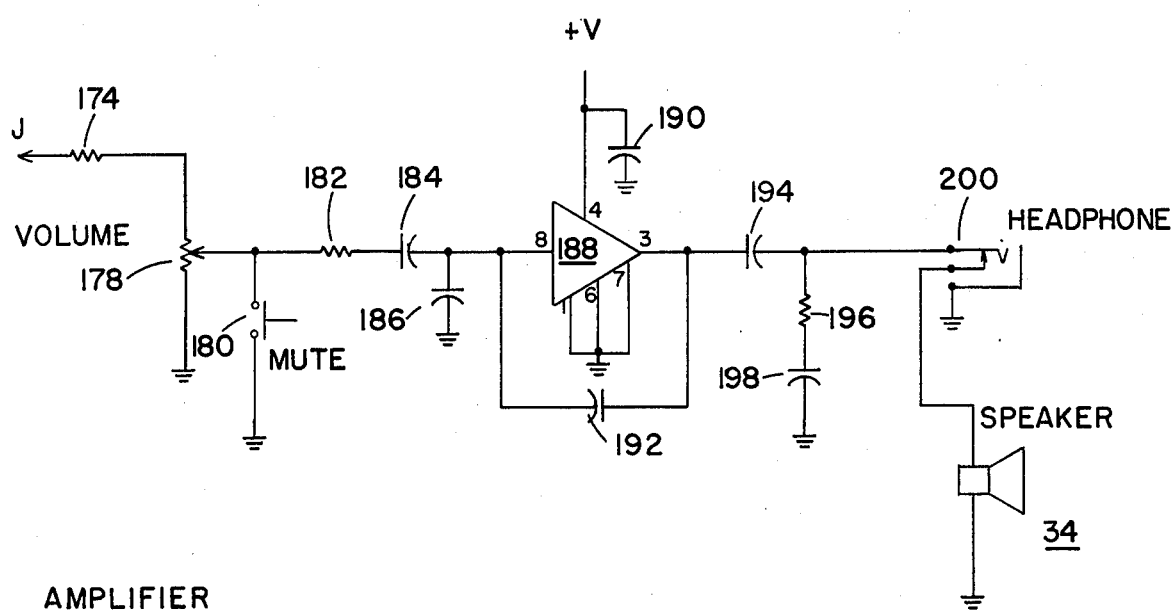
AMPLIFIER

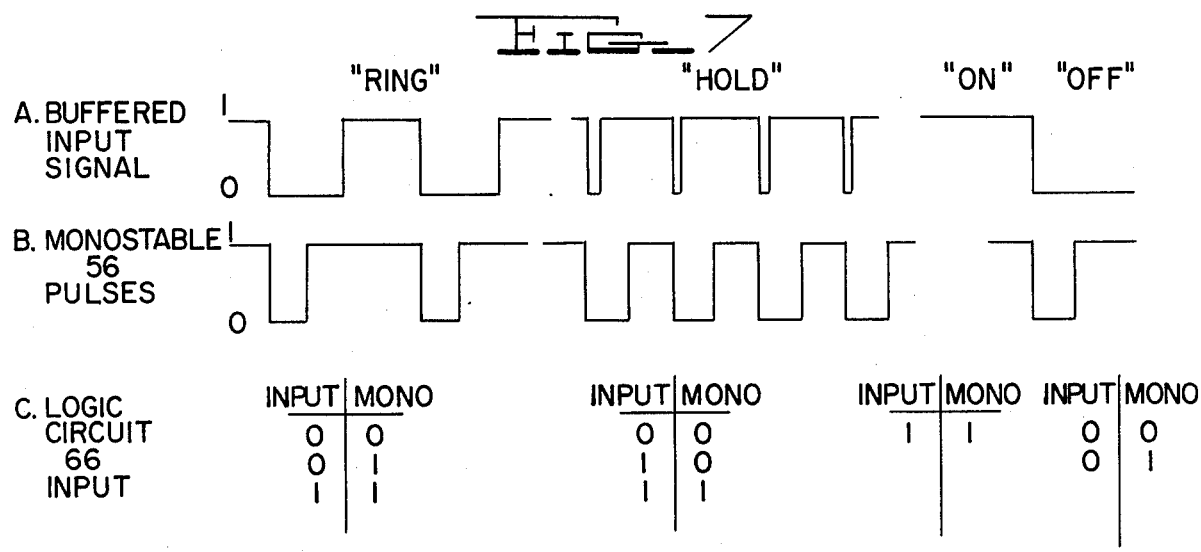

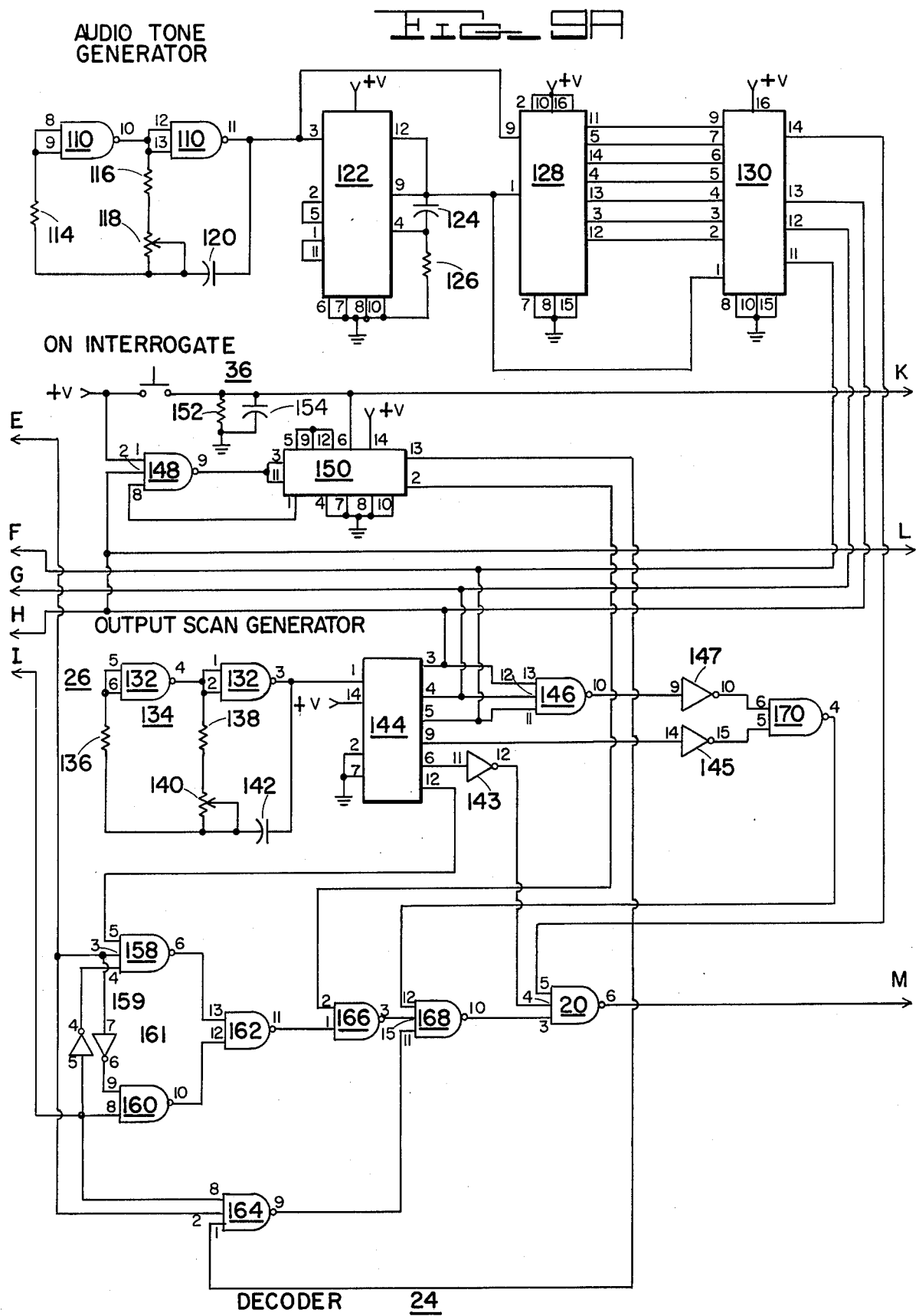

AUDIO SENSORY APPARATUS AND METHOD FOR MONITORING INDICATOR LAMP STATUS OF MULTI-LINE TELEPHONE INSTRUMENT

BACKGROUND OF THE INVENTION

1. Field of the Invention

This invention relates generally to apparatus and methods for enabling a blind person to determine the status of a plurality of telephone lines from the illumination condition of signal lamps respectively associated therewith.

2. Description of the Prior Art

Conventional, multi-line business telephone instruments have a plurality of line selector push-buttons, each push-button having a lamp associated therewith for visually indicating the status of its particular line. These lamps typically indicate four line status conditions, i.e., "ON" with the particular lamp having a steady state illumination indicating that the respective line is in use; "OFF" with the particular lamp off indicating that the respective line is not in use; "RINGING" with the particular lamp flashing at a one per second repetition rate indicating that the respective line is ringing, and; "HOLD" with the particular lamp flashing at a two per second repetition rate indicating that the respective line has been placed in the "HOLD" status; manifestly, a blind person in attempting to determine a particular line having an incoming call, or in attempting to locate a vacant line, may interrupt a conversation on another particular line or disconnect a line which is in the "HOLD" status.

U.S. Patent Application Ser. No. 657,719, filed Feb. 13, 1976, now U.S. Pat. No. 4,028,502, by the present applicants, and assigned to the assignee of the present application, discloses vibratory push-button apparatus for providing auditory and tactile recognition of an indicator lamp associated with a line selector push-button of a multi-line telephone instrument. While the apparatus of the aforesaid application is satisfactory for some purposes, it has been found to have several deficiencies including an inconveniently long period of time required to identify active lines when several push-buttons are vibrating simultaneously, sensitivity to ambient light, and the non-harmonious character of the push-button vibration.

It is accordingly desirable to provide an apparatus and method for monitoring the illumination condition of the indicator lamps of a multi-line telephone instrument which provides an acoustic output which is uniquely different for each line. More particularly, it is desirable to provide such a system in which the "HOLD" and "RING" status of each line is differentiated by a tone having a tone duration uniquely different for each line, the "HOLD" status of a particular line being indicated by a pulsating modulation superimposed on the basic tone, the "ON" status of the several lines being determined by a user-controlled interrogation function. Finally, it is desirable that such an apparatus and method require no electrical connection and minimal mechanical attachment to the telephone instrument.

SUMMARY OF THE INVENTION

The invention, in its broader aspects, provides a system for enabling a blind person to determine the status of a plurality of telephone lines from the illumination condition of signal lamps associated therewith which respectively indicate the status of each line, the system including means for sensing the illumination condition for each lamp and providing first signals respectively responsive thereto. In accordance with the invention, means are provided for digitally encoding the first signals, and first means are provided for sequentially and repetitively coupling the sensing means to the encoding means so that the first signals are serially and repetitively converted to digitally coded signals. Storage means are provided coupled to the encoding means for serially storing the coded signals. Means are provided for sequentially and repetitively generating, at a predetermined rate, a plurality of audio tone signals respectively having progressively different frequencies, and means are provided for serially reading the coded signals out of storage means at the predetermined rate. Means are provided for serially decoding the coded signals to provide decoded signals respectively corresponding to the illumination conditions, and means are provided for providing an audible output in response to the tone signals. Second means are provided for coupling the signal generating means to the output means in response to predetermined ones of the decoded signals so that a predetermined condition of a particular lamp is indicated by an audible tone of a particular tone duration.

It is accordingly an object of the invention to provide an improved system for enabling a blind person to determine the status of a plurality of telephone lines from the illumination condition of indicator lamps respectively associated therewith.

Another object of the invention is to provide an improved method for enabling a blind person to determine the status of a plurality of telephone lines from the illumination condition of indicator lamps respectively associated therewith.

A further object of the invention is to provide an improved apparatus and method for determining the status of particular telephone lines having audible tones uniquely associated with different lines by having different tone duration periods for said audible tones.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a block diagram generally illustrating the apparatus of the invention;

FIG. 2 schematically illustrates the photoconductor pick-up assembly of the preferred embodiment of the invention;

FIG. 3 schematically illustrates the in-put encoder of the preferred embodiment;

FIG. 6 schematically illustrates the power supply and amplifier of the preferred embodiment;

FIG. 7 shows wave forms and the logic applied to the digital encoder, and the conversion of the input logic to a two-bit code;

FIG. 8 shows the relationship of wave forms applied to the decoder; and

FIG. 9A and 9B schematically illustrates a modified output processor.

DESCRIPTION OF THE PREFERRED EMBODIMENT

Figure 4:
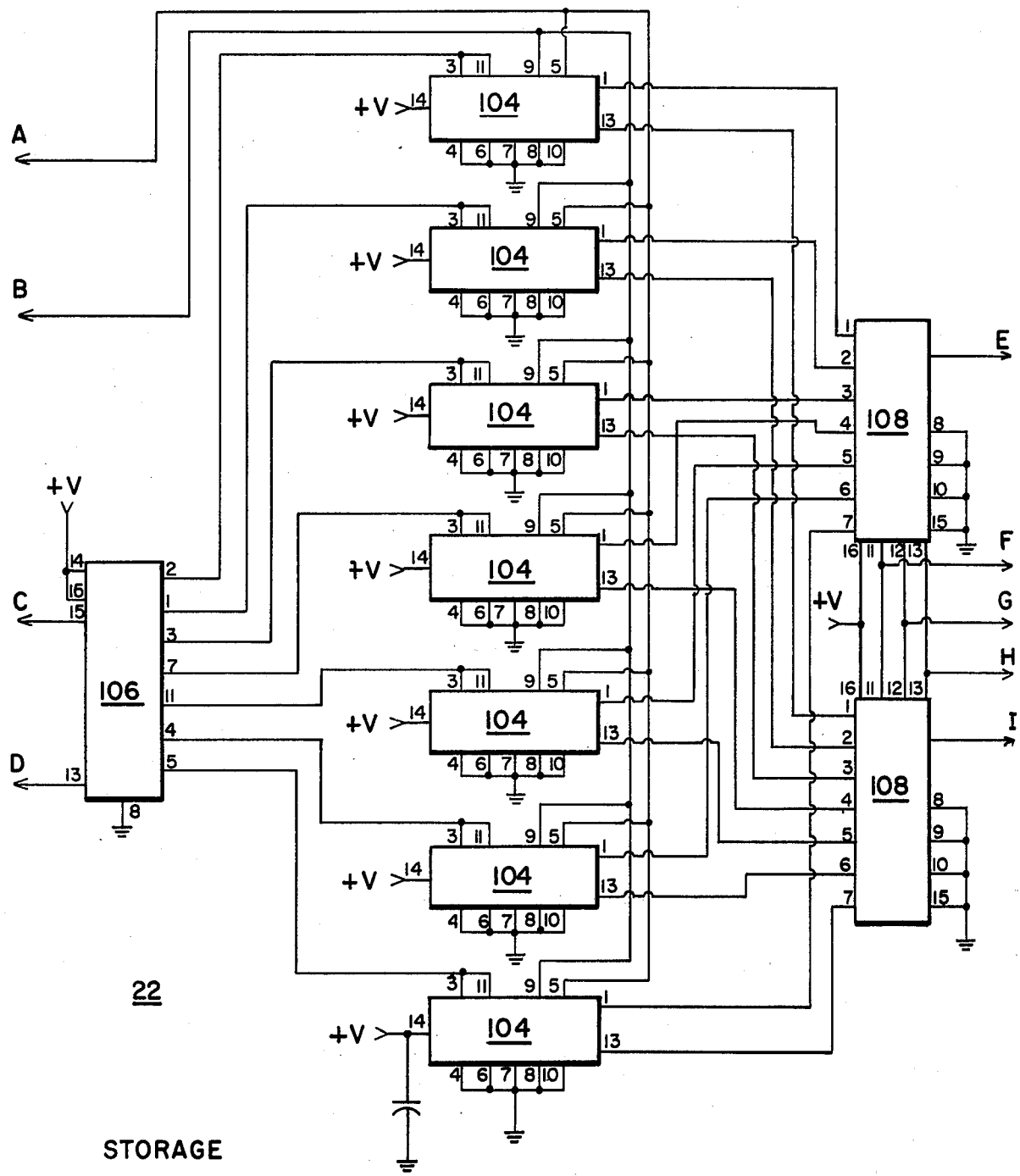
FIG. 4 schematically illustrates the storage system of the preferred embodiment.

Referring now to FIG. 1, the apparatus of the invention, generally indicated at 10, is adapted for use with a conventional multi-line telephone instrument (not shown) having a plurality of indicator lamps 12 respectively associated with the telephone lines. Indicator lamps 12, which may be miniature incandescent lamps or light emitting diodes respectively under or adjacent each line-selecting push-button of the instrument, typically indicate four line status conditions, i.e., "ON" with the particular lamp having steady-state illumination indicating that its associated line is in use; "OFF" with the particular lamp off indicating that its associated line is not in use or available; "RINGING" with the particular lamp flashing at a one per second repetition rate indicating that the associated line is ringing; and "HOLD" with the particular lamp flashing at a two per second repetition rate indicating that the associated line has been placed in the "HOLD" condition.

Photoconductors 14 are respectively associated with lamps 12 to receive illumination therefrom. Each photoconductor 14 provides a zero voltage level signal in response to the "OFF" condition of its associate lamps and a different level signal, such as ten volts, in response to its associated lamp being "ON". The "RING" status of a particular line is typically indicated by 500 millisecond flashes of the respective lamp, the flashes having a one second repetition rate, i.e., one "ON" flash per second whereas, the "HOLD" status is typically indicated by 450 millisecond flashes at a 500 millisecond repetition rate, i.e., two "ON" flashes per second. Thus, the "RING" status of a particular line is indicated by ten volt positive-going pulses having a one second repetition rate and the "HOLD" status is indicated by ten volt positive-going pulses having a one-half second repetition rate.

Switching means schematically shown at 16, actuated by input scan generator 18, sequentially connects photoconductors 14 to digital encoder 20 so that the signals sequentially provided by photoconductors 14 are serially encoded in a digital code. Digital encoder 20 is coupled to storage or memory circuit 22, which is also coupled to input scanner 18, so that the coded signals are sequentially read into storage at the switching and encoding rate.

Storage circuit 22 is coupled to decoder circuit 24 and output scan generator 26 is coupled to both storage circuit 22 and decoder circuit 24 so that the coded signals are sequentially and repetitively read-out of storage and decoded at a rate determined by output scan generator 26. Output scan generator 26 is also coupled to audio tone generator 28 which generates at a rate established by output scan generator 26, a plurality of audio tone signals having progressively different frequencies, there being one particular tone signal uniquely associated with each line.

Decoder circuit 24 normally provides decoded "RING" and "HOLD" signals to output gate 30 which couples audio tone generator 28 to amplifier 32 and speaker 34 in response to the decoded "RING" or "HOLD" signals. Thus, a decode "RING" signal corresponding to a "RING" signal on a particular line actuates output gate 30 to impress the tone signal associated with that particular line on amplifier 32. In the case of a decoded "HOLD" signal corresponding to a "HOLD" signal on a particular line, the corresponding audio tone is modulated by a pulsating signal. "ON INTERROGATE" circuit 36 is coupled to decoder 24 selectively to actuate the same to provide decoded "ON" signals to output gate 30 for one cycle of operation of output scan generator 26.

The apparatus 10 of FIG. 1 provides an acoustic output for those lines having either "HOLD" or "RING" status. The "HOLD" or "RING" status of a particular line is identified by the frequency of an audio tone and by the time delay between the particular tone and a reference tone pulse, "HOLD" and "RING" being differentiated by the use of a pulsing modulation superimposed on the basic tone to identify the "HOLD" status. The lines that are in use or "ON" cause no output until the "ON INTERROGATE" circuit 36 is actuated by the user; actuation of the "ON INTERROGATE" circuit 36 interrupts the "HOLD" and "RING" readout and provides the same audio tone frequency and delay sequence for the "ON" readout.

Referring now to FIGS. 2 through 6 of the drawings in which like elements are indicated by like reference numerals, there is shown a specific and preferred embodiment of apparatus 10 adapted for use with telephone instruments or switchboard systems having up to seven lines each having a status-indicating lamp associated therewith. In the specific embodiment, seven photoconductors 14, each associated with a respective lamp 12 (not shown in FIGS. 2 – 6) are connected to one part of a conventional connector 38-1. In the specific embodiment, photoconductors 14 were VACTEC VT 913 H; however, it will be understood that other photoconductors and other types of light-sensing devices may be employed.

Referring now specifically to FIG. 3, input scan generator 18 and digital encoder 20 comprise the input encoder system. Connector part 38-2 mates with connector part 38-1 (FIG. 2) and respectively connects trimmer resistors 40 in circuit with photoconductors 14 which adjust the sensitivity of each input channel. Each photoconductor 14 is also connected to data selector circuit 16 which forms a step switch. Data selector 16 sequentially and repetitively connects photoconductors 14 to digital encoder 20, and also buffers the input signals.

NAND gates 42 form an astable multivibrator 44 which generates clock pulses which are applied to the input (pin 1) of seven-stage binary counter 54. The outputs of counter 54 for the most significant bits (pin 3 ÷ 128, pin 4 ÷ 64, pin 5 ÷ 32) are connected to the control inputs (pins 11, 12, 13) of input data selector 16.

Depending on the particular clock pulses applied to the input terminals (11, 12, 13) of input data selector 16, one of the input pins (1–7) will be switched to the output terminal (pin 14). Thus, each input signal, in buffered form and in sequence, is applied to the input of monostable multi-vibrator 56 formed by NAND gates 58. Monostable multi-vibrator 56 triggers on the negative edge of the input wave form and provides a negative-going pulse approximately 250 milliseconds wide. The wave forms resulting from the four input conditions, i.e., "RING", "HOLD", "ON" and "OFF" are shown in FIG. 7A and B.

The logic states resulting from comparison of the input and monostable wave forms for the four input conditions are shown in FIG. 7C. Referring to FIG. 7C, it will be seen that the code 10 is unique to the "HOLD" condition; the code 01 in conjunction with the code 11 is unique to the "RING" condition; and that the code 11 without the codes 10 and 01 is unique to the "ON" condition.

NAND logic gates 66 in conjunction with inverters 68 sense the codes 01, 10 and 11, and set the S-R flip-flops 80, 82, 84 formed by NAND gates 78. The code 10 will set flip-flop 78-1, 78-2; the code 01 will set flip-flop 78-3, 78-4; and the code 11 will set flip-flop 78-5, 78-6. The "Q" output terminal (pins 3, 10, 10) of the S-R flip-flops 80, 82, 84 are referred to as "H", "R", and "O", respectively. If all three of the S-R flip-flops 80, 82, 84 are initially reset by a pulse on the common reset line 86, the various modes of the input will cause different output states to be created, as shown in the table FIG. 7C. Output NAND gates 88, 90, 92 combine the conditions in the outputs H, R, O into a two-bit code which appears at outputs A and B, as shown in FIG. 7D. It will be observed that the input signals have been reduced to a two-bit code which indicates the four possible status conditions for a particular line.

Inverter 94 along with NOR gate 96 are controlled by the remaining four least significant bits of binary counter 54 (pins 6, 9, 11, 12) and cause a reset pulse to be provided on common reset line 86 of SR flip-flops 80, 82, 84. In the specific embodiment, clock generator 44 provides a clock frequency of 10 Hz which results in the application of the reset pulse approximately 400 milliseconds following each successive switching of the input signals by data selector 16; this allows time for extraneous triggering of monostable multi-vibrator 56 to be ignored by SR flip-flops 80, 82, 84. NOR gate 98 and NAND 100 develop clock and reset pulses for storage circuit 22.

At the clock frequency of 10 Hz, input data selector 16 switches inputs every 1.6 seconds for a complete scan time of 12.8 seconds. Referring now to FIG. 4, storage circuit 22 of the specific embodiment uses type D (dual) flip-flops 104 for the memory. Here, the A and B inputs are fed from the A and B outputs of digital encoder 20 (FIG. 3). Inputs A and B are connected to the data inputs of dual flip-flops 104. The clock inputs of flip-flops 104 are fed from octal counter 106 which is synchronized with the input encoder by clock and reset inputs C and D.

As the octal counter 106 advances, it supplies pulses successively to flip-flops 104 thus, whatever digital code is present on the A and B input lines at the particular instant a clock pulse appears at the clock inputs (pins 3, 11) of a particular flip-flop 104, that code is stored in that particular flip-flop until the next clock pulse appears. Since the clock pulses applied to dual flip-flops 104 are in synchronism with the switching by data selector 16, the seven inputs are sequentially sampled, decoded and stored in flip-flops 104, and this data is updated each time the input encoder completes a scan. NOR gate 98 (FIG. 3) develops a reset pulse which guarantees that the octal counter 106 is on the correct step to store data in storage circuit 22 in the correct flip-flop 104. NAND gate 100 in the input encoder forms a pulse to cause octal counter 106 to advance, and consequently store data, immediately before input data selector 16 switches to the next input. The pulse from NAND gate 100 is applied to the clock enable input (pin 13) of octal counter 106 to account for its negative polarity.

The apparatus thus-far described is capable of developing a memory of seven, two-bit words that describe the status of seven telephone lines. In order to provide a serially encoded output, data selectors 108 switch one word stored in the memory to their E and I outputs according to the code at their inputs F, G, H (pins 11, 12, 13) which is controlled by the output processor, as will now be described.

Figure 5:
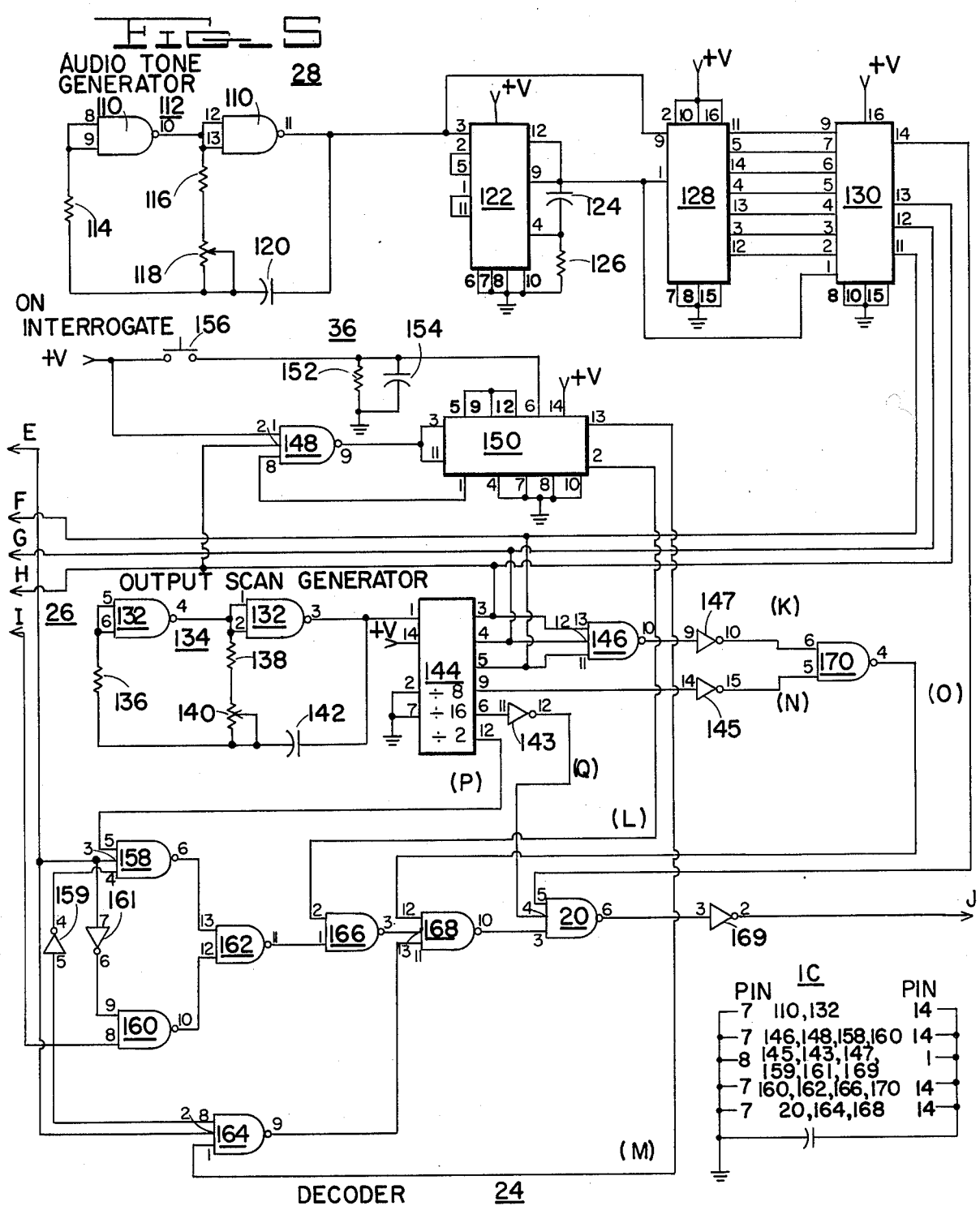
FIG. 5 schematically illustrates the output processor of the system of the preferred embodiment.

Referring now to FIG. 5, the output processor includes decoder logic 24 which determines the correct output for various codes supplied by storage circuit 22, output scan generator 26, and multi-frequency tone generator 28.

NAND gates 110 form an astable multi-vibrator 112 which serves as a master clock pulse generator for all audio tone generation. The clock output of multi-vibrator 112 (pin 11) is fed to dual flip-flop 122 arranged as a divide by 3 counter. Dual, four-stage binary counter 128 is clocked by flip-flop 122 (pin 1) and multi-vibrator 112 (pin 9), respectively. Thus, output frequencies are available at approximately one-half octave intervals at the basic frequency of multi-vibrator 112 (4800 Hz in the specific embodiment) divided by 2, 3, 4, 6, 8, 12, 16 and 24. These outputs are fed to data selector 130 so that, by selecting the proper code at its inputs (pins 11, 12, 13) one of the output frequencies appears at its output terminal (pin 14).

NAND gates 132 form astable multi-vibrator 134 which controls the output scan rate over a 1:10 frequency range. Multi-vibrator 134 clocks seven-stage binary counter 144 which generates all of the timing signals for the output processor. The three most significant bits (pins 3, 4, 5) from counter 144 control data selector 130 of tone generator 28. NAND gate 146 generates a pulse when control lines F, G, H assume the 1-1-1 state corresponding to data selector 130 switching its input on pin 1 to its output on pin 14. This is the input which remains unused on data selectors 108 (pins 8, 9, 10) of storage circuit 22 (FIG. 4) and is the position at which the reference tone pulse, to be hereinafter described, is generated.

NAND gate 148 and dual flip-flop 150 comprise the controlling logic for the "ON INTERROGATE" function. During normal functioning, both Q outputs of dual flip-flop 150 (pins 1, 13) are at logic 0. When the "ON INTERROGATE" push-button 156 is depressed, the first stage of the dual flip-flop 150 is set which causes its $\bar{Q}$ output (pin 2) to go to logic 0 which will later be shown to interrupt the flow of "HOLD" and "RING" information to the output. Simultaneously, a logic 1 appears at the Q output of the first stage of dual flip-flop 150 (pin 1) which allows NAND gate 148 to feed data from the most significant bit of counter 144 (pin 3) to the clock inputs (pins 3, 11) of dual flip-flop 150. When counter 144 resets the first scanned position, the clock pulse present at the inputs of dual flip-flop 150 causes logic 1's to be stored. In the case of the first stage of dual flip-flop 150, this results in no change because the flip-flop was previously set; however, in the case of the second stage of flip-flop 150, the status of its $\bar{Q}$ outputs (pins 13, 12) reverse causing the "ON INTERROGATE" output state to be achieved. When the next clock pulse is received by dual flip-flop 150, logic 0's are caused to be stored thus returning the circuit to its initial condition. Thus, when the "ON INTERROGATE" push-button 156 is pressed, the "HOLD" and "RING" information is immediately inhibited and when the output scanner 130 returns to its reference position (pin 1), the "ON" readout is activated for one complete scan following which the system returns to the "HOLD", "RING" readout, as hereafter described.

There are nine inputs to decoder 24 which, by a system of NAND gates 158, 160, 162, 164, 166, 168, 170 and 20, assembles the output code. The nine inputs to decoder 24 are as follows:

| | |
|---|---|
| E, I | - data inputs from storage 22 (0-0 "OFF", 0-1 "RING", 1-0 "HOLD", 1-1 "ON") |
| O | - tone modulation from data selector 130 |
| P | - chop rate for "HOLD" from binary counter 144 ÷2 output (pin 12) |
| Q | - tone burst gate, normal, from counter 144 ÷ 16 output (pin 6) |
| K | - SYNC (reference) pulse from gate 146 |
| L | - RING-HOLD control line from dual flip-flop 150 |
| M | - "ON" control line from flip-flop 150 |
| N | - tone burst gate, SYNC pulse, from counter 144 ÷ 8 output (pin 9) |

The relationship of wave forms P, N and Q is shown in FIG. 8. Multi-vibrator 134 provides clock pulses at the rate of 48–400 Hz under the control of scan rate adjustment potentiometer 140. The logic states of the nine inputs E, I, O, P, Q, K, L, M, N for the desired outputs are shown below:

"RING" - $\bar{E}$. I. O. R. L
"HOLD" - E. $\bar{I}$. O. R. Q. L
"ON" - E. I. O. Q. M
Reference - O. Q. K. N Inspection of the circuitry of decoder 24 will reveal that the above-enumerated relations are obtained.

It will now be seen that the two-bit code stored in storage 22 (FIG. 4) is read-out of storage by the output processor (FIG. 5) at a rate which is selectively slower than the rate at which the input data is read into storage 22 by data selector 16. It will be seen that a 4800 Hz reference tone provided by audio tone generator 22 is switched at the beginning of each read-out cycle by data selector 130 to output gate 20, that tone along with the (Q) and (N) pulses from counter 144 and the SYNC pulse from gate 146 (which establishes the beginning of each read-out cycle) result in actuation of gates 168, 170 and 20 to provide the reference tone signal in output line (J). Similarly, a "RING" code appearing on input lines (E) and (I) corresponding to the input signal from any particular photoconductor 14, such as 14-5 (FIG. 2), along with a (Q) pulse from counter 144 and an (L) signal from flip-flop 150 actuates gates 166, 168 and 20 to pass an audio tone signal (O) having a frequency unique to photoconductor 14-5 to output circuit (J). Likewise, a "HOLD" code on input lines (E), (I) corresponding to a "HOLD" input signal sensed by a photoconductor 14, such as 14-3 (FIG. 2), along with the chopping or tone modulating signal (P) and signal (Q) from counter 144, and signal (L) from flip-flop 150 actuates gates 158, 162, 166, 168 and 20 to pass an audio tone signal (O) having a frequency unique to photoconductor 14-3 to output circuit (J). Here, it will be observed that the particular tone signal (O) is modulated by the signal (P) from counter 144 in response to a "HOLD" code. Finally, it will be seen that actuation of the "ON INTERROGATE" push-button 156 and the appearance of an "ON" code in input lines (E) and (I) corresponding to a "ON" input signal sensed by a particular photoconductor 14, such as photoconductor 14-2 (FIG. 2), along with a (Q) pulse from counter 144 and an "ON" control signal from flip-flop 150 gates an audio tone signal (O) having a frequency unique to photoconductor 14-2 to output circuit (J).

Referring now to FIG. 6, output circuit (J) from the output processor is fed to audio amplifier 188 which is coupled to speaker 34, or which may alternatively be coupled to headphones (not shown) by jack 200.

Power supply 202 comprises voltage regulator 204 which provides an appropriate DC voltage (plus 7.5 volts in the specific embodiment) to power supply buss 206. A conventional external AC adapter 220 is provided for energizing power supply 202 from an external source 222 of 120 volt, 60 cycle alternating current, adaptor 220 comprising transformer 224 and rectifiers 226 forming a full-wave rectifier. Adapter 220 is connected to power supply 202 by plug 228 mating with jack 218.

In order to train operators in the use of the apparatus of the invention before using it with an actual telephone instrument, a training device may be provided selectively generating the four input states, i.e., "ON", "OFF", "RING", and "HOLD" on each of seven input lines adapted to be connected by a connector to pins 1 - 7 of connector 38-2 of digital encoder 20 (FIG. 3) in lieu of connector 38-1 (FIG. 2). With such a training device, particular combinations of input states can be set-up so that the operator can become familiar with the code. Any system which will selectively generate signals corresponding to those generated by photoconductors 14 in response to "ON", "RING" and "HOLD" lamp states will suffice.

Figure 9B:
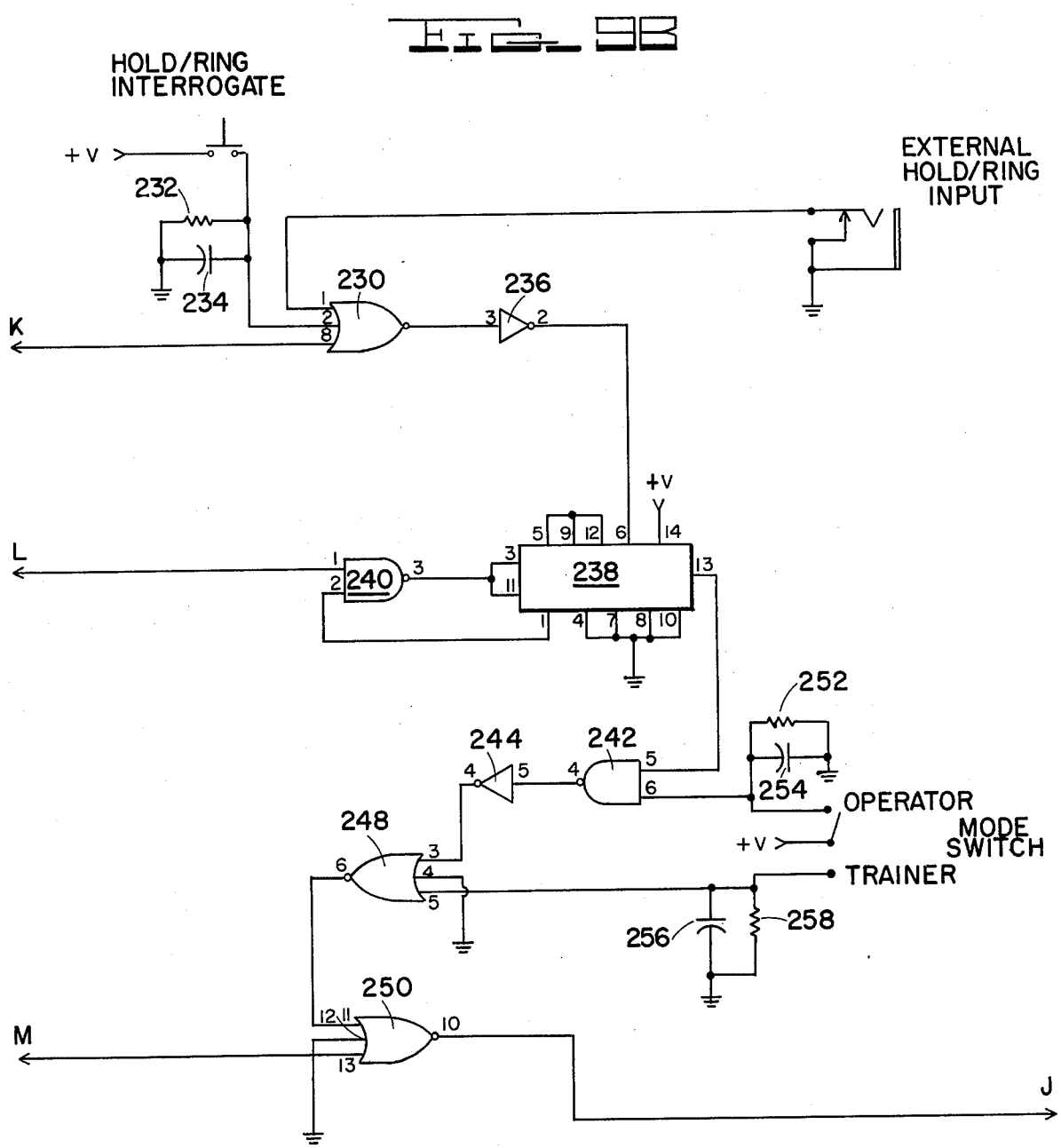

Referring now to FIGS. 9A and 9B in which like elements are indicated by like reference numerals, a modified output processor is shown which may be substituted for the output processor shown in FIG. 5. The modified output processor system of FIGS. 9A and 9B differs from the embodiment shown in FIG. 5 in the addition of a Mode Switch capable of selecting "operator" or "trainer" modes, and a push-button to initiate a "RING/HOLD INTERROGATE" function. With the Mode Switch (FIG. 9B) in the "trainer" position, and with the trainer device above-described connected to plug 38-2 (FIG. 3), operation of the system is identical to that previously described. However, in the "OPERATOR" position, the system remains silent at all times until acted on by an external stimulus which may take the form of actuation of the "ON INTERROGATE" push-button as above-described, actuation of the "RING/HOLD INTERROGATE" push-button, or a signal at the external "RING/HOLD" input.

If the "RING/HOLD INTERROGATE" function is energized, one complete scan of the "RING/HOLD" memory is initiated with the scan beginning at the reference tone. After the scan is completed, the device reverts to a silent or no output condition. The external "RING/HOLD" input provides a means to initiate the "RING/HOLD INTERROGATE" function by an external signal such as provided by a detector used to sense the aural bell signal from the associated telephone system. Thus, the audio sensory adapter system would remain silent until the occurrence of an incoming call at which time it would automatically enter the "RING/HOLD" readout mode for as long as the ringing continues. It will be readily apparent that there are other possibilities for the external "RING/HOLD" input.

As in the case of the embodiment of FIG. 5, if the "RING/HOLD INTERROGATE" function is energized, one complete scan of the "RING/HOLD" memory is initiated with the scan beginning at the reference tone and, after the scan is completed, the system reverts to a silent or no-output condition.

It will be observed that the part of the modified output processor shown in FIG. 9A is identical to that shown in FIG. 5 but with the addition of lines K and L, and the elimination of invertor 169. In FIGS. 9A and 9B, line K connects the "ON INTERROGATE" pushbutton to NOR gate 230. Invertor 236 couples NOR gate 230 to dual-D flip-flop 238. Line L couples line H to NAND gate 240 which has its output coupled to flip-flop 238.

NAND gate 240 and flip-flop 238 form the controlling logic for the "RING/HOLD INTERROGATE" function. This sub-system is identical to that formed by NAND gate 148 and flip-flop 150 in the system of FIG. 5. Flip-flop 238 is set by a signal from the OR gate formed by NOR gate 230 and invertor 236. Thus, flip-flop 238 can be set by the "ON INTERROGATE" push-button, the "RING/HOLD INTERROGATE" push-button, or an external "RING/HOLD" input signal. The set condition allows NAND gate 240 to accept the scan timing signals. When a timing signal arrives at NAND gate 240, it allows the output of flip-flop 238 at pin 213 to go to a logic 1 for one complete scan.

NOR gate 250 replaces the function of invertor 169 (FIG. 5) and provides signal gating as well. The gate input (pin 11) of NOR gate 250 is controlled by NOR gate 248 which, in turn, is controlled by an input from the Mode Switch in the "trainer" position or the AND gate formed by NAND gate 242 and inverter 244. Thus, the output is held in a muted state unless the Mode Switch is in the "trainer" position or is in the "operator" position and flip-flop 238 is energized. The parallel resister-capacitor networks 152, 154; 232, 234; 252, 254; and 256, 258 act as debounce circuitry for the switch and push-button inputs.

In the specific embodiments of the invention shown in FIGS. 2 – 6 and 9A and 9B, the following components and component values were employed:

| COMPONENTS AND COMPONENT VALUES (all integrated circuits Motorola part numbers) | |
|---|---|
| Photoconductors 14 | Vactec VT913H |
| Data Selectors 16, 108, 130 | MC 14512 |
| R46 | 6.8 M |
| R48 | 470K |
| R50 | 2.0M |
| C52, 154, 198, 234, 254, 256 | .05 mfd. |
| Counters 54, 144 | MC 14024 |
| NAND gates 42, 58, 66, 78, 88, 92, 100, 134, 160, 162, 166, 170, 240, 242 | MC 14011 |
| C60 | .25 mfd. |
| R62 | 470 K |
| R64 | 2.0 M |
| Inverters 68, 94, 159, 161, 145, 147, 169, 236, 244 | MC 14049 |
| R70, 71, 118, 126, 140, 152, 232, 252, 258 | 1.0 M |
| C72, 74 | 50 mmfd. |
| NOR gate 96 | MC14002 |
| NAND gate 100 | MC14012 |
| Dual D flip-flops 104, 122, 150, 238 | MC14013 |
| C102, 214 | 1000 mmfd. |
| R114 | 3.0 M |
| R116 | 270 K |
| C120 | 82 mmfd. |
| C124 | 50 mmfd. |
| Dual counter 128 | MC 14520 |
| R136 | 3.0 M |
| R138 | 100 K |
| C142 | .04 mfd. |
| Counter 144 | MC 14022 |
| NAND gates 146, 148, 158, 168 | 14023 |
| R178 | 5 K |
| R182 | 5.6K |
| C184 | 1 mfd. |
| C186 | 470 mmfd. |
| Amplifier 188 | MC 1306P |
| C192 | 30 mmfd. |
| C194 | 200 mfd. |
| R-196 | 8.2 ohms |
| NOR gates 230, 248, 250 | MC14025 |
| Voltage Regulator 204 | MFC 6033A |
| R208 | 3.9 ohms |
| R210 | 1.5 K |
| R212 | 1.8 K |
| C216 | 1000 mfd. |

While there have been described above the principles of this invention in connection with specific apparatus, it is to be clearly understood that this description is made only by way of example and not as a limitation to the scope of the invention.

What is claimed is:

1. In a system for enabling a blind person to determine the status of a plurality of telephone lines from the illumination condition of signal lamps associated therewith which respectively indicate the status of each line, said system including a plurality of means for respectively sensing the illumination condition of said lamps and providing first signals respectively responsive thereto, the combination comprising: means for digitally encoding said first signals; first means for sequentially and repetitively coupling said sensing means to said encoding means whereby said first signals are serially and repetitively converted to digitally coded signals; storage means coupled to said encoding means for serially storing said coded signals; means for serially reading said coded signals out of said storage means at a predetermined rate; means responsive to said reading means for sequentially and repetitively generating at said predetermined rate a plurality of audio tone signals respectively having progressively different tone frequencies, there being a different tone frequency for each said line; means for serially decoding said encoded signals to provide decoded signals respectively corresponding to said illumination conditions; means for providing an audible output in response to said tone signals; and second means for coupling said signal generating means to said audible output means in response to predetermined ones of said decoded signals representing predetermined conditions of said lamps whereby a predetermined condition of a particular lamp is indicated by an audible tone of a particular tone duration period.

2. The system of claim 1 wherein said lamp conditions respectively indicate "RING", "OFF" and at least one other line status, said second coupling means being responsive to decoded "RING" signals and decoded signals corresponding to said other status, and further comprising means for modifying the respective tone signal in response to a decoded signal indicating said other status of a particular line.

3. The system of claim 2 wherein said other status is "HOLD", said modifying means including means for superimposing a pulsating signal on the respective tone signal, said "RING" and "HOLD" status being indicated by flashing of the respective lamps at different predetermined rates.

4. The system of claim 1 wherein said lamp conditions respectively indicate "ON", "OFF" and at least one other line status, said other status being indicated by a flashing of the respective lamps at a predetermined rate, said decoding means normally providing decoded signals in response to coded signals corresponding to said other status, and further comprising means coupled to said decoding means for selectively actuating the same to provide decoded signals in response to decoded "ON" signals, said second coupling means being responsive to decoded "ON" signals and decoded signals corresponding to said other status.

5. The system of claim 4 wherein said other status is "RING".

6. The system of claim 1 wherein said lamp conditions respectively indicate "ON", "OFF", "RING" and "HOLD" line status, said "RING" and "HOLD" status being respectively indicated by flashing of the respective lamps at different predetermined rates, said decoding means normally providing decoded signals in response to coded "RING" and "HOLD" signals; and further comprising means coupled to said decoding means for selectively actuating the same to provide decoded signals in response to decoded "ON" signals, and further comprising means for superimposing a pulsating signal on the respective tone signal in response to a decoded "HOLD" signal, said second coupling means being responsive to decoded "RING", "HOLD" and "ON" signals.

7. The system of claim 6 wherein said signal generating means includes means for repeating said plurality of tone signals at a predetermined cyclic repetition rate, said repeating means being coupled to said read-out means for actuating the same at said predetermined rate, said selective actuating means including means for inhibiting decoding of said "RING" signals and enabling decoding of said "ON" signals during one cycle of operation of said signal generating means.

8. The system of claim 7 further comprising second means coupled to said decoding means for selectively actuating the same to provide decoded signals in response to decoded "RING" and "HOLD" signals, said second selective-actuating means including means for actuating said decoding means during one cycle of operation of said signal generating means.

9. The system of claim 7 wherein said sensing means are photocells.

10. The system of claim 7 wherein said signal generating means generates a reference tone signal at the beginning of each cycle of operation thereof prior to generation of each plurality of tone signals, said second coupling means also being responsive to said reference tone signal.

11. The system of claim 1 wherein said first signals respectively have first and second levels, said levels and changes therein indicating said lamp conditions, said first coupling means including means for generating clock pulses, and switching means for sequentially coupling said sensing means to said decoding means in response to predetermined ones of said clock pulses, said switching means including means for repeating said sequential coupling at a predetermined cyclic repetition rate; said encoding means comprising means for generating a pulse of predetermined duration in response to a predetermined change in the level of said first signals, and logic means for comparing said first signals and said last-named pulses thereby to provide said coded signals.

12. The system of claim 11 wherein said lamp conditions respectively indicate "ON", "OFF", "RING" and "HOLD" line status, said "RING" and "HOLD" status being respectively indicated by flashing of the respective lamps at different predetermined rates, said first level of said first signals indicating the "ON" status and said second level indicating the "OFF" status, said first signal level changes being pulses of said first level having different repetition rates respectively indicating said "RING" and "HOLD" status, said pulse generating means responding to said first signal pulses, said logic means including means for providing a two-bit digital code in response to said comparison.

13. The system of claim 12 wherein said logic means is coupled to said clock pulse generating means and responds to predetermined ones of said clock pulses.

14. The system of claim 12 wherein said storage means includes a plurality of storage elements equal in number to said sensing means, and second switching means for sequentially coupling said logic means to said storage elements in response to predetermined ones of said clock pulses whereby said coded signals are read into storage in synchronism with said first-named switching means, said second switching means including means for repeating said read-in at said cyclic rate.

15. The system of claim 14 wherein said read-out means includes means for generating second clock pulses, and third switching means for sequentially coupling said storage elements to said decoding means in response to predetermined ones of said second clock pulses, said tone signal generating means including means for simultaneously generating said different frequency tone signals equal in number to said sensing means, and fourth switching means for coupling said tone signal generating means to said second coupling means in response to predetermined ones of said second clock pulses whereby said different frequency tones are coupled to said second coupling means in synchronism with said coded signal read-out, said fourth switching means including means responsive to said second clock pulses for repeating said switching thereof at a second predetermined cyclic rate.

16. The system of claim 15 wherein said decoding means includes second logic means coupled to said second clock pulse generating means for normally providing decoded "RING" and "HOLD" signals in response to predetermined ones of said second clock pulses; and further comprising means coupled to said second logic means for selectively actuating the same to provide decoded "ON" signals in response to predetermined ones of said second clock pulses, said selective actuating means being coupled to said second clock pulse generating means and being responsive thereto for actuating said second logic means during one cycle of operation of said tone signal generating means; said tone signal generating means including means for generating a reference tone at the beginning of each cycle of operation thereof prior to generation of each plurality of tone signals, said second logic means including means for providing a pulsating signal in response to predetermined ones of said second clock pulses, said second coupling means superimposing said pulsating signal on the respective tone signal in response to a decoded "HOLD" signal, said second coupling means being responsive to "RING", "HOLD" and "ON" signals and said reference tone.

17. The system of claim 16 further comprising second means coupled to said second logic means for selectively actuating the same to provide decoded "RING" and "HOLD" signals in response to predetermined ones of said second clock pulses, said second selective actuating means being coupled to said second clock pulse generating means and being responsive thereto for actuating said second logic means during one cycle of operation of said tone signal generating means.

18. In a method of enabling a blind person to determine the status of a plurality of telephone lines from the illumination condition of signal lamps associated therewith which respectively indicate the status of each line, said method including sensing the illumination condition of each lamp and providing first signals respectively responsive thereto, the steps comprising: serially and repetitively digitally encoding said first signals; serially storing the coded signals; reading said coded signals out of storage and decoding the same at a predetermined rate; sequentially and repetitively generating at said predetermined rate a plurality of audio tone signals having progressively different frequencies, there being a different frequency for each said line; and converting particular ones of said plurality of tone signals to audible tones in response to predetermined ones of said decoded signals representing predetermined conditions of said lamps whereby a predetermined condition of a particular lamp is indicated by an audible tone of a particular tone duration period.

19. The method of claim 18 wherein said lamp conditions respectively indicate "RING", "OFF" and at least one other line status, said conversion being responsive to decoded "RING" signals and decoded signals corresponding to said other status, and comprising the further step of modifying the respective tone signal in response to a decoded signal indicating said other status of a particular line.

20. The method of claim 19 wherein said other status is "HOLD", said modifying step comprising superimposing a pulsating signal on the respective tone signal, said "RING" and "HOLD" status being indicated by flashing of the respective lamp at different predetermined rates.

21. The method of claim 18 wherein said lamp conditions respectively indicate "ON", "OFF" and at least one other status indicated by flashing of the respective lamp at a predetermined rate, said decoded signals normally being provided in response to coded signals corresponding to said other status, and comprising the further step of selectively providing decoded signals in response to coded "ON" signals.

22. The method of claim 21 wherein said other status is "RING".

23. The method of claim 18 wherein said lamp conditions respectively indicate "ON", "OFF", "RING" and "HOLD" line status, said "RING" and "HOLD" status being respectively indicated by flashing of the respective lamps at different predetermined rates, said decoding normally being provided in response to a decoded "RING" signal, and selectively providing decoded signals in response to coded "ON" signals.

24. The method of claim 23 wherein said first signals are sequentially encoded at another predetermined rate and the encoding is repeated at a first predetermined cyclic rate, said coded signals being stored at said other rate, the generation of said tone signals being repeated at a second predetermined cyclic rate, said last-named step including inhibiting decoding of said "RING" signals and enabling decoding of said "ON" signals during one cycle of tone signal generation.

25. The method of claim 24 wherein said tone signal generating step includes generating a reference tone signal prior to the generation of each plurality of tone signals, said converting step including converting said reference tone signal to an audible tone prior to converting said plurality of tone signals.

26. The method of claim 18 wherein said first signals respectively have first and second levels, said levels and changes therein indicating said lamp conditions, said encoding step including generating a pulse of predetermined duration in response to a predetermined change in the level of said first signals, and comparing said first signals and said pulses thereof to provide the coded signals.

27. The method of claim 26 wherein said lamp conditions respectively indicate "ON", "OFF", "RING" and "HOLD" line status, said "RING" and "HOLD" status being respectively indicated by flashing of the respective lamps at different predetermined rates, said first level of said first signals indicating the "ON" status and said second level indicating the "OFF" status, said level changes being pulses of said first level having different repetition rates respectively indicating said "RING" and "HOLD" status, said comparing step providing a two-bit digital code.

28. In a system for enabling a blind person to determine the status of a plurality of telephone lines from the illumination condition of signal lamps, each lamp providing a visual signal which respectively visually indicates the status of each line, the combination comprising:

first means for converting the visual signal from an illuminated lamp associated with each line to an electrical signal;

second means responsive to said electrical signals for providing a tone for each line with each tone being different than the tone of any of the other lines;

third means coupled to said first means responsive to said lamp conditions for providing tone duration periods corresponding to the line status.

29. The system of claim 28 including fourth means for scanning said first means and for controlling said second means to produce each of said tones corresponding to an illuminated lamp and only one audible tone at a time.

30. The system of claim 29 wherein said lamp conditions respectively indicate "RING", "OFF", "ON", and "HOLD";

fifth means coupled to said third means for interrogating said third means for "ON" lamp conditions.

* * * * *